(12) United States Patent
Miller

(10) Patent No.: US 6,859,418 B2
(45) Date of Patent: Feb. 22, 2005

(54) SONAR OBJECT DETECTION SYSTEM

(75) Inventor: Lloyd E. Miller, Alpharetta, GA (US)

(73) Assignee: Clever Devices, Ltd., Syosset, NY (US)

( * ) Notice: Subject to any disclaimer, the term of this patent is extended or adjusted under 35 U.S.C. 154(b) by 0 days.

(21) Appl. No.: 10/630,214

(22) Filed: Jul. 30, 2003

(65) Prior Publication Data

US 2004/0125699 A1 Jul. 1, 2004

Related U.S. Application Data

(60) Provisional application No. 60/412,350, filed on Sep. 20, 2002.

(51) Int. Cl.[7] ................................................ G01S 15/00
(52) U.S. Cl. ................................. 367/99; 367/902
(58) Field of Search ........................ 367/137, 87, 99, 367/902, 98, 117, 105, 13; 701/301, 96; 702/99, 103, 104

(56) References Cited

U.S. PATENT DOCUMENTS 4,581,726 A * 4/1986 Makino et al. ............. 367/902
5,060,205 A * 10/1991 Phelan ........................ 367/98
5,319,611 A * 6/1994 Korba ......................... 367/98

FOREIGN PATENT DOCUMENTS

JP 58189571 A * 11/1983 ............. G01S/7/52

OTHER PUBLICATIONS

Andean Instruments, ULS-04 Ultrasonic Level Meter User's Manual, 2004, 17 Pages.*

* cited by examiner

*Primary Examiner*—Daniel Pihulic
(74) *Attorney, Agent, or Firm*—Dilworth & Barrese LLP (57) ABSTRACT

An airborne sonar collision avoidance system is disclosed. The system compensates for changes in temperature in real time to provide more accurate sonar detection. In addition, the sensors are arranged in a communications network that allows for the sensors to be programmed at run time, thus providing the ability to relocate the sensors without having to pre-program the sensors before the sensors are installed onto a different location.

11 Claims, 9 Drawing Sheets

SONAR OBJECT DETECTION SYSTEM

CROSS-REFERENCE TO RELATED APPLICATIONS

This application claims the benefit of U.S. Provisional Application No. 60/412,350, filed on Sep. 20, 2002, entitled "Sonar Collision Avoidance System."

TECHNICAL FIELD

The present invention relates to ultrasonic systems and more particularly to an airborne sonar detection system.

BACKGROUND

Ultrasonic ranging systems use airborne high frequency sound waves to detect target objects. In these systems, high frequency sound waves are generated and transmitted to an object. The transmitted sound waves then bounce off the object and return to their source as an echo. The distance from the source of the sound waves to the object can then be measured based on the speed of sound and the time it takes for the sound wave to travel to an object and return to the source.

Although ultrasonic sound with frequencies ranging from 20 to 200 kHz can be used for a wide variety of ranging and sensing applications, when designing an ultrasonic-based system, a great care must be taken to compensate for the many variables involved. An example of such variables includes dynamic temperature changes in the atmosphere. If atmospheric temperature is not properly compensated for, an erratic system operation will result. An uncompensated system could, for example, exhibit undesirable traits such as a range that varies, blind spots, moving blind spots, a target that is detected one time and not the next, unwanted target acquisitions, and false target acquisitions.

In addition, a reliable ultrasonic system needs to account for acoustic properties that are affected by the environmental dynamics. Such acoustic properties include variation in the speed and wavelength of sound in air over temperature; variation in sound attenuation based on frequency, temperature, and humidity and over distance; variation in the return echo, target strength, based on target distance, shape and composition; turbulence in the detection zone; effects of background noise; and sound radiating pattern, beam angle, of the selected ultrasonic transducer.

For example, speed of sound varies from 1041 feet/second ("ft/sec") at −10 degrees Fahrenheit ("F.") to 1172 ft/sec at 110 F. This presents a change of 12.5% and would result in an apparent change in measurement of 2.5 ft over a 20 ft distance. Further, wavelength is defined as the speed of sound in inches/second ("in/sec") divided by frequency, w1=c/f Since the speed of sound, c, changes over temperature so does the wavelength. Solving for wavelength, it can be seen that a 40 kHz signal at −10 F. has a wavelength of 0.3123 inch, while at +110 F., the wavelength is 0.3516 inch. For reflection to occur, the wavelength should be small compared to the dimension of the target because the larger the target in comparison to wavelength, the stronger the return. Thus it can be seen that as temperature goes up, wavelength goes up and the amount of reflection goes down. That is, the target strength diminishes.

Sound propagates through air by causing air molecules to collide with each other pushing the sound along like a wall of dominoes. As sound travels through air, these collisions result in friction loss, higher frequency means more collisions, hence greater loss. Complicating the issue is the fact that density and composition of the medium varies with temperature and humidity. Further, the medium behaves differently above 50 kHz. A useful approximation for figuring maximum attenuation up to 50 kHz and above 50 kHz may be used. While useful for approximating maximum ranges, however, the actual temperature humidity attenuation is highly non-linear. Accordingly, this attenuation also needs to be compensated for or target strength will vary radically over temperature causing erratic target acquisition.

As described above, because both sound and target objects have complex properties, many considerations need to be taken into account when building an ultrasonic system. Accordingly, there is a need for a properly designed ultrasonic system that compensates for the environmental factors such as dynamic temperature changes.

SUMMARY

There is provided a sonar detection system and method that compensates for dynamic temperature changes in real time. In one aspect, the method includes an object detection model residing in a sensor. The model compensates for atmospheric changes that result from environmental dynamics. For example, an air density model outputs air density depending on the temperature. From this air density output, a gain model computes amount of gain used for processing a received echo signal. A thermistor and resistor network is added to a feedback loop of a preamp and causes the preamp to automatically change gain with temperature according to the output of the air density and gain models.

In another aspect, the ultrasonic detection system includes a controller, and a plurality of sensors. The controller is connected to a data input of a first one of the plurality of sensors. A data output of the first one of the plurality of sensors is connected to a data input of a second one of the plurality of sensors, such that the subsequent sensors in the plurality are connected via data output of one to data input of another. The controller polls for addresses and configures them for the sensors in real time, thus allowing the addresses of the sensors to change.

DETAILED DESCRIPTION

Figure 1:
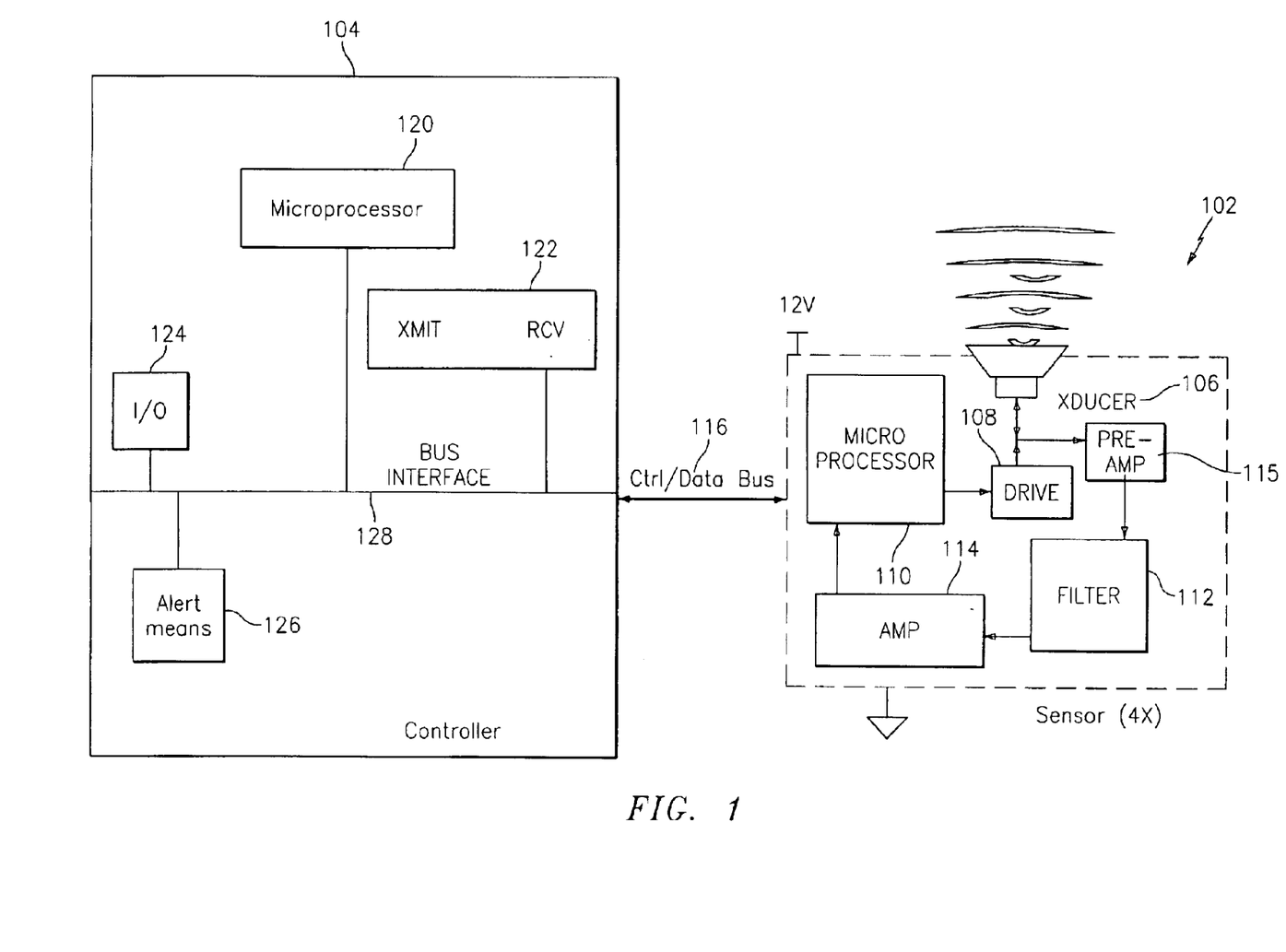
FIG. 1 is a block diagram of an ultrasonic sensor in one embodiment of the present invention that compensates for atmospheric temperature in real time.

FIG. 1 is a block diagram of an ultrasonic sensor in one embodiment of the present invention that compensates for atmospheric temperature in real time. A sensor 102 is connected to a controller 104 by, for example, a bus 116. The sensor 102 may also communicate to the controller wirelessly. The sensor 102 includes a transducer 106 that outputs sound waves as directed by the drive 108. The sensor 102 also receives sound wave echoes from an object, that is, the sound waves that bounce back after hitting an object. The sensor 102 in one aspect may include separate transducers for transmitting and receiving sound waves.

A variable gain pre-amplifier 115 receives echo signals from the transducer 106. The variable gain pre-amplifier provides real time compensating for environment dynamics such as the environment temperature. A filter 112 filters the amplified echo signals. The filtered echo signals are then input to an amp 114. The amp 114 amplifies the signals and outputs the amplified signals to a microprocessor 110. An object detection algorithm may reside in the sensor 102, for example, in the microprocessor 110. The microprocessor 110 computes distances of objects using the received echo signals and the time duration between the transmission of sound waves and receipt of echo signals. The microprocessor 100 may use an air density and gain models to determine how much gain is used on the received signal as a function of temperature.

The microprocessor 110 outputs the computed data such as distances, for example, via the data bus 116, to a controller 104. The controller then alerts a user, for example using a user interface such as displays and sound alerts, that objects are nearby. The controller 104, for example, includes a microprocessor 120 for processing data received or to be transmitted to the sensor 102, user interface functions, input/output ("I/O") functions, etc. The controller 104 also may include a transmitter/receiver 122 for communicating data to the sensor 102. The transmitter/receiver 122 may be a wired or wireless transceiver. The alert means 126 may include an alarm or a display interface for alerting or informing a user about the objects detected by the sensor 102. The I/O 124 performs typical input/output functions.

The controller 104 may include a bus interface 128 for communicating data or control signals among the microprocessor 120, transceiver 122, I/O 124, and alert means 126. The typical functions of microprocessor, transceiver, I/O, alarms, and user interfaces are generally known to those skilled in the art and therefore, will not be described in further detail here. The controller 104 generally controls how individual sensors 102 should operate.

Figure 2:
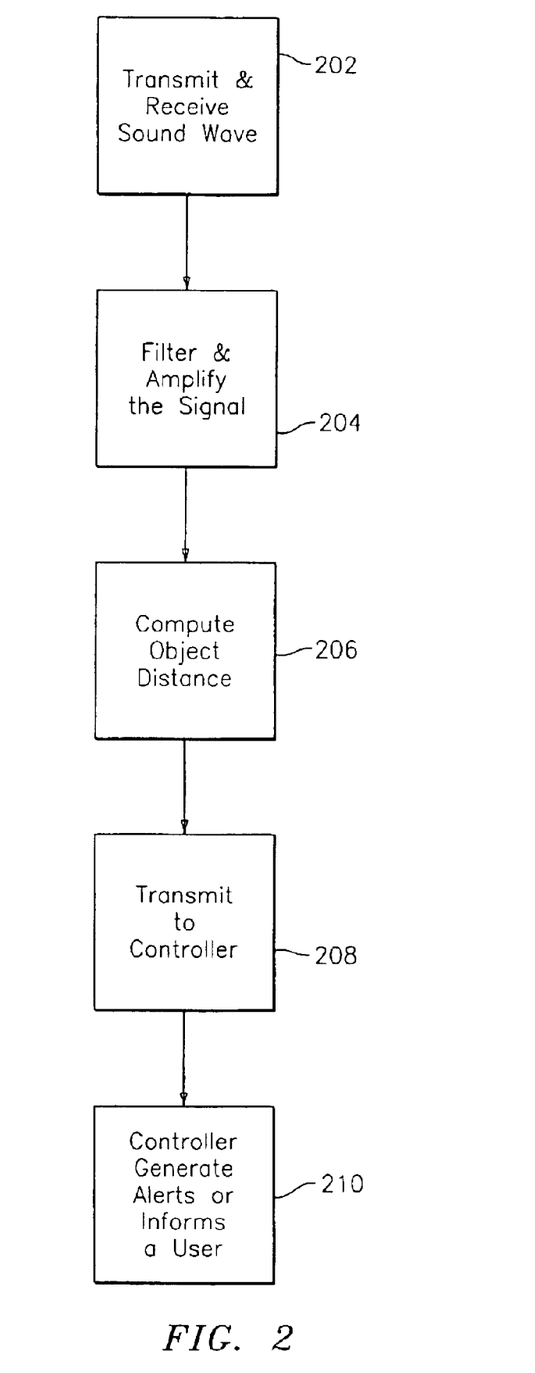
FIG. 2 is a flow diagram illustrating a method of detecting objects, compensating for temperature in real time, in one embodiment of the present invention.

FIG. 2 is a flow diagram illustrating a method of detecting objects, compensating for temperature in real time, in one embodiment of the present invention. At 202, transformed sound waves are transmitted and echo signals are received. The echo signals are filtered and amplified at 204. The signals are then input to a microprocessor that computes the distance of a detected object using the information about the echoed signals such as the time it took for the echoed signal to be reflected back to the transducer.

At 206, using an air density and gain model that adjusts the gain on the received echo signals, the distance of an object is computed and thus object is detected. At 208, the detected data is transmitted to a controller. At 210, the controller generates an alert or otherwise informs a user of the detected object, for example, by a displaying the data on a user interface or other visual warnings or by audio warnings such as beeping alarm or voice activated alarm.

As described above, in one aspect, atmospheric and gain models are used to compensate the atmospheric changes, for example, temperature. Although the atmosphere is in constant motion and is inhomogeneous, useful approximations may be formed if the variations in the medium are small with respect to the wavelength. In one aspect, the ideal gas laws of Charles and Boyle are used to calculate air density, with a basic assumption that the atmosphere within the range of technology is stable during this very short time of flight of the sound waves. The ideal gas law takes the base form of $PV=nRT$, where P=pressure, V=volume, n=mole volume of gas, R=the gas constant, and T=temperature. The formula for density is derived as $D=P/T*R$. Gas constants are published in most chemistry texts. The value of R for dry air is 287. With pressure assumed to be constant, in this case barometric pressure at sea level, and temperature varied, the values shown in Table 1 result.

TABLE 1

Atmospheric pressure data (at sea level) based on temperature and humidity Data is based on published values of $H_2O$ saturation vapor pressure Calculations are based on the law of partial pressures and the ideal gas law Temperature for this humidity data is 0 degrees f.

At a relative humidity of 0 percent, the air density at sea level is 1.38249 kg/m^3
At a relative humidity of 10 percent, the air density at sea level is 1.38241 kg/m^3
At a relative humidity of 20 percent, the air density at sea level is 1.38233 kg/m^3
At a relative humidity of 30 percent, the air density at sea level is 1.38225 kg/m^3
At a relative humidity of 40 percent, the air density at sea level is 1.38218 kg/m^3
At a relative humidity of 50 percent, the air density at sea level is 1.3821 kg/m^3
At a relative humidity of 60 percent, the air density at sea level is 1.38202 kg/m^3
At a relative humidity of 70 percent, the air density at sea level is 1.38195 kg/m^3
At a relative humidity of 80 percent, the air density at sea level is 1.38187 kg/m^3
At a relative humidity of 90 percent, the air density at sea level is 1.38179 kg/m^3
At a relative humidity of 100 percent, the air density at sea level is 1.38171 kg/m^3

Temperature for this humidity data is 5 degrees f.

At a relative humidity of 0 percent, the air density at sea level is 1.36761 kg/m^3
At a relative humidity of 10 percent, the air density at sea level is 1.36751 kg/m^3
At a relative humidity of 20 percent, the air density at sea level is 1.36742 kg/m^3
At a relative humidity of 30 percent, the air density at sea level is 1.36732 kg/m^3
At a relative humidity of 40 percent, the air density at sea level is 1.36722 kg/m^3
At a relative humidity of 50 percent, the air density at sea level is 1.36713 kg/m^3

TABLE 1-continued

Atmospheric pressure data (at sea level) based on temperature and humidity Data is based on published values of $H_2O$ saturation vapor pressure Calculations are based on the law of partial pressures and the ideal gas law At a relative humidity of 60 percent, the air density at sea level is 1.36703 kg/m^3
At a relative humidity of 70 percent, the air density at sea level is 1.36693 kg/m^3
At a relative humidity of 80 percent, the air density at sea level is 1.36684 kg/m^3
At a relative humidity of 90 percent, the air density at sea level is 1.36674 kg/m^3
At a relative humidity of 100 percent, the air density at sea level is 1.36664 kg/m^3
Temperature for this humidity data is 10 degrees f.

At a relative humidity of 0 percent, the air density at sea level is 1.35305 kg/m^3
At a relative humidity of 10 percent, the air density at sea level is 1.35293 kg/m^3
At a relative humidity of 20 percent, the air density at sea level is 1.35281 kg/m^3
At a relative humidity of 30 percent, the air density at sea level is 1.35269 kg/m^3
At a relative humidity of 40 percent, the air density at sea level is 1.35257 kg/m^3
At a relative humidity of 50 percent, the air density at sea level is 1.35245 kg/m^3
At a relative humidity of 60 percent, the air density at sea level is 1.35232 kg/m^3
At a relative humidity of 70 percent, the air density at sea level is 1.3522 kg/m^3
At a relative humidity of 80 percent, the air density at sea level is 1.35208 kg/m^3
At a relative humidity of 90 percent, the air density at sea level is 1.35196 kg/m^3
At a relative humidity of 100 percent, the air density at sea level is 1.35184 kg/m^3
Temperature for this humidity data is 15 degrees f.

At a relative humidity of 0 percent, the air density at sea level is 1.3388 kg/m^3
At a relative humidity of 10 percent, the air density at sea level is 1.33865 kg/m^3
At a relative humidity of 20 percent, the air density at sea level is 1.3385 kg/m^3
At a relative humidity of 30 percent, the air density at sea level is 1.33835 kg/m^3
At a relative humidity of 40 percent, the air density at sea level is 1.3382 kg/m^3
At a relative humidity of 50 percent, the air density at sea level is 1.33805 kg/m^3
At a relative humidity of 60 percent, the air density at sea level is 1.3379 kg/m^3
At a relative humidity of 70 percent, the air density at sea level is 1.33775 kg/m^3
At a relative humidity of 80 percent, the air density at sea level is 1.3376 kg/m^3
At a relative humidity of 90 percent, the air density at sea level is 1.33745 kg/m^3
At a relative humidity of 100 percent, the air density at sea level is 1.3373 kg/m^3
Temperature for this humidity data is 20 degrees f.

At a relative humidity of 0 percent, the air density at sea level is 1.32484 kg/m^3
At a relative humidity of 10 percent, the air density at sea level is 1.32466 kg/m^3
At a relative humidity of 20 percent, the air density at sea level is 1.32448 kg/m^3
At a relative humidity of 30 percent, the air density at sea level is 1.32429 kg/m^3
At a relative humidity of 40 percent, the air density at sea level is 1.32411 kg/m^3
At a relative humidity of 50 percent, the air density at sea level is 1.32393 kg/m^3
At a relative humidity of 60 percent, the air density at sea level is 1.32375 kg/m^3
At a relative humidity of 70 percent, the air density at sea level is 1.32356 kg/m^3
At a relative humidity of 80 percent, the air density at sea level is 1.32338 kg/m^3
At a relative humidity of 90 percent, the air density at sea level is 1.3232 kg/m^3
At a relative humidity of 100 percent, the air density at sea level is 1.32301 kg/m^3
Temperature for this humidity data is 25 degrees f.

At a relative humidity of 0 percent, the air density at sea level is 1.31118 kg/m^3
At a relative humidity of 10 percent, the air density at sea level is 1.31095 kg/m^3
At a relative humidity of 20 percent, the air density at sea level is 1.31073 kg/m^3
At a relative humidity of 30 percent, the air density at sea level is 1.3105 kg/m^3
At a relative humidity of 40 percent, the air density at sea level is 1.31028 kg/m^3
At a relative humidity of 50 percent, the air density at sea level is 1.31005 kg/m^3
At a relative humidity of 60 percent, the air density at sea level is 1.30983 kg/m^3
At a relative humidity of 70 percent, the air density at sea level is 1.3096 kg/m^3
At a relative humidity of 80 percent, the air density at sea level is 1.30938 kg/m^3
At a relative humidity of 90 percent, the air density at sea level is 1.30915 kg/m^3
At a relative humidity of 100 percent, the air density at sea level is 1.30893 kg/m^3
Temperature for this humidity data is 30 degrees f.

At a relative humidity of 0 percent, the air density at sea level is 1.29779 kg/m^3
At a relative humidity of 10 percent, the air density at sea level is 1.29752 kg/m^3
At a relative humidity of 20 percent, the air density at sea level is 1.29725 kg/m^3
At a relative humidity of 30 percent, the air density at sea level is 1.29697 kg/m^3
At a relative humidity of 40 percent, the air density at sea level is 1.2967 kg/m^3
At a relative humidity of 50 percent, the air density at sea level is 1.29643 kg/m^3
At a relative humidity of 60 percent, the air density at sea level is 1.29616 kg/m^3
At a relative humidity of 70 percent, the air density at sea level is 1.29589 kg/m^3
At a relative humidity of 80 percent, the air density at sea level is 1.29562 kg/m^3
At a relative humidity of 90 percent, the air density at sea level is 1.29535 kg/m^3
At a relative humidity of 100 percent, the air density at sea level is 1.29508 kg/m^3
Temperature for this humidity data is 35 degrees f.

At a relative humidity of 0 percent, the air density at sea level is 1.28467 kg/m^3
At a relative humidity of 10 percent, the air density at sea level is 1.28434 kg/m^3
At a relative humidity of 20 percent, the air density at sea level is 1.28401 kg/m^3

TABLE 1-continued

Atmospheric pressure data (at sea level) based on temperature and humidity Data is based on published values of $H_2O$ saturation vapor pressure Calculations are based on the law of partial pressures and the ideal gas law At a relative humidity of 30 percent, the air density at sea level is 1.28368 kg/m^3
At a relative humidity of 40 percent, the air density at sea level is 1.28335 kg/m^3
At a relative humidity of 50 percent, the air density at sea level is 1.28302 kg/m^3
At a relative humidity of 60 percent, the air density at sea level is 1.28269 kg/m^3
At a relative humidity of 70 percent, the air density at sea level is 1.28235 kg/m^3
At a relative humidity of 80 percent, the air density at sea level is 1.28202 kg/m^3
At a relative humidity of 90 percent, the air density at sea level is 1.28169 kg/m^3
At a relative humidity of 100 percent, the air density at sea level is 1.28136 kg/m^3
Temperature for this humidity data is 40 degrees f.

At a relative humidity of 0 percent, the air density at sea level is 1.27181 kg/m^3
At a relative humidity of 10 percent, the air density at sea level is 1.27142 kg/m^3
At a relative humidity of 20 percent, the air density at sea level is 1.27102 kg/m^3
At a relative humidity of 30 percent, the air density at sea level is 1.27062 kg/m^3
At a relative humidity of 40 percent, the air density at sea level is 1.27022 kg/m^3
At a relative humidity of 50 percent, the air density at sea level is 1.26982 kg/m^3
At a relative humidity of 60 percent, the air density at sea level is 1.26942 kg/m^3
At a relative humidity of 70 percent, the air density at sea level is 1.26902 kg/m^3
At a relative humidity of 80 percent, the air density at sea level is 1.26863 kg/m^3
At a relative humidity of 90 percent, the air density at sea level is 1.26823 kg/m^3
At a relative humidity of 100 percent, the air density at sea level is 1.26783 kg/m^3
Temperature for this humidity data is 45 degrees f.

At a relative humidity of 0 percent, the air density at sea level is 1.25921 kg/m^3
At a relative humidity of 10 percent, the air density at sea level is 1.25874 kg/m^3
At a relative humidity of 20 percent, the air density at sea level is 1.25826 kg/m^3
At a relative humidity of 30 percent, the air density at sea level is 1.25778 kg/m^3
At a relative humidity of 40 percent, the air density at sea level is 1.2573 kg/m^3
At a relative humidity of 50 percent, the air density at sea level is 1.25682 kg/m^3
At a relative humidity of 60 percent, the air density at sea level is 1.25634 kg/m^3
At a relative humidity of 70 percent, the air density at sea level is 1.25586 kg/m^3
At a relative humidity of 80 percent, the air density at sea level is 1.25538 kg/m^3
At a relative humidity of 90 percent, the air density at sea level is 1.2549 kg/m^3
At a relative humidity of 100 percent, the air density at sea level is 1.25442 kg/m^3
Temperature for this humidity data is 50 degrees f.

At a relative humidity of 0 percent, the air density at sea level is 1.24686 kg/m^3
At a relative humidity of 10 percent, the air density at sea level is 1.24629 kg/m^3
At a relative humidity of 20 percent, the air density at sea level is 1.24572 kg/m^3
At a relative humidity of 30 percent, the air density at sea level is 1.24514 kg/m^3
At a relative humidity of 40 percent, the air density at sea level is 1.24457 kg/m^3
At a relative humidity of 50 percent, the air density at sea level is 1.244 kg/m^3
At a relative humidity of 60 percent, the air density at sea level is 1.24343 kg/m^3
At a relative humidity of 70 percent, the air density at sea level is 1.24286 kg/m^3
At a relative humidity of 80 percent, the air density at sea level is 1.24228 kg/m^3
At a relative humidity of 90 percent, the air density at sea level is 1.24171 kg/m^3
At a relative humidity of 100 percent, the air density at sea level is 1.24114 kg/m^3
Temperature for this humidity data is 55 degrees f.

At a relative humidity of 0 percent, the air density at sea level is 1.23475 kg/m^3
At a relative humidity of 10 percent, the air density at sea level is 1.23407 kg/m^3
At a relative humidity of 20 percent, the air density at sea level is 1.23338 kg/m^3
At a relative humidity of 30 percent, the air density at sea level is 1.2327 kg/m^3
At a relative humidity of 40 percent, the air density at sea level is 1.23202 kg/m^3
At a relative humidity of 50 percent, the air density at sea level is 1.23134 kg/m^3
At a relative humidity of 60 percent, the air density at sea level is 1.23066 kg/m^3
At a relative humidity of 70 percent, the air density at sea level is 1.22997 kg/m^3
At a relative humidity of 80 percent, the air density at sea level is 1.22929 kg/m^3
At a relative humidity of 90 percent, the air density at sea level is 1.22861 kg/m^3
At a relative humidity of 100 percent, the air density at sea level is 1.22793 kg/m^3
Temperature for this humidity data is 60 degrees f.

At a relative humidity of 0 percent, the air density at sea level is 1.22287 kg/m^3
At a relative humidity of 10 percent, the air density at sea level is 1.22206 kg/m^3
At a relative humidity of 20 percent, the air density at sea level is 1.22125 kg/m^3
At a relative humidity of 30 percent, the air density at sea level is 1.22044 kg/m^3
At a relative humidity of 40 percent, the air density at sea level is 1.21964 kg/m^3
At a relative humidity of 50 percent, the air density at sea level is 1.21883 kg/m^3
At a relative humidity of 60 percent, the air density at sea level is 1.21802 kg/m^3
At a relative humidity of 70 percent, the air density at sea level is 1.21721 kg/m^3
At a relative humidity of 80 percent, the air density at sea level is 1.21641 kg/m^3
At a relative humidity of 90 percent, the air density at sea level is 1.2156 kg/m^3
At a relative humidity of 100 percent, the air density at sea level is 1.21479 kg/m^3

TABLE 1-continued

Atmospheric pressure data (at sea level) based on temperature and humidity Data is based on published values of $H_2O$ saturation vapor pressure Calculations are based on the law of partial pressures and the ideal gas law Temperature for this humidity data is 65 degrees f.

At a relative humidity of 0 percent, the air density at sea level is 1.21121 kg/m^3
At a relative humidity of 10 percent, the air density at sea level is 1.21027 kg/m^3
At a relative humidity of 20 percent, the air density at sea level is 1.20932 kg/m^3
At a relative humidity of 30 percent, the air density at sea level is 1.20837 kg/m^3
At a relative humidity of 40 percent, the air density at sea level is 1.20742 kg/m^3
At a relative humidity of 50 percent, the air density at sea level is 1.20647 kg/m^3
At a relative humidity of 60 percent, the air density at sea level is 1.20552 kg/m^3
At a relative humidity of 70 percent, the air density at sea level is 1.20457 kg/m^3
At a relative humidity of 80 percent, the air density at sea level is 1.20362 kg/m^3
At a relative humidity of 90 percent, the air density at sea level is 1.20267 kg/m^3
At a relative humidity of 100 percent, the air density at sea level is 1.20172 kg/m^3

Temperature for this humidity data is 70 degrees f.

At a relative humidity of 0 percent, the air density at sea level is 1.19978 kg/m^3
At a relative humidity of 10 percent, the air density at sea level is 1.19866 kg/m^3
At a relative humidity of 20 percent, the air density at sea level is 1.19754 kg/m^3
At a relative humidity of 30 percent, the air density at sea level is 1.19642 kg/m^3
At a relative humidity of 40 percent, the air density at sea level is 1.1953 kg/m^3
At a relative humidity of 50 percent, the air density at sea level is 1.19418 kg/m^3
At a relative humidity of 60 percent, the air density at sea level is 1.19306 kg/m^3
At a relative humidity of 70 percent, the air density at sea level is 1.19195 kg/m^3
At a relative humidity of 80 percent, the air density at sea level is 1.19083 kg/m^3
At a relative humidity of 90 percent, the air density at sea level is 1.18971 kg/m^3
At a relative humidity of 100 percent, the air density at sea level is 1.18859 kg/m^3

Temperature for this humidity data is 75 degrees f.

At a relative humidity of 0 percent, the air density at sea level is 1.18856 kg/m^3
At a relative humidity of 10 percent, the air density at sea level is 1.18725 kg/m^3
At a relative humidity of 20 percent, the air density at sea level is 1.18594 kg/m^3
At a relative humidity of 30 percent, the air density at sea level is 1.18462 kg/m^3
At a relative humidity of 40 percent, the air density at sea level is 1.18331 kg/m^3
At a relative humidity of 50 percent, the air density at sea level is 1.182 kg/m^3
At a relative humidity of 60 percent, the air density at sea level is 1.18068 kg/m^3
At a relative humidity of 70 percent, the air density at sea level is 1.17937 kg/m^3
At a relative humidity of 80 percent, the air density at sea level is 1.17806 kg/m^3
At a relative humidity of 90 percent, the air density at sea level is 1.17675 kg/m^3
At a relative humidity of 100 percent, the air density at sea level is 1.17543 kg/m^3

Temperature for this humidity data is 80 degrees f.

At a relative humidity of 0 percent, the air density at sea level is 1.17755 kg/m^3
At a relative humidity of 10 percent, the air density at sea level is 1.17601 kg/m^3
At a relative humidity of 20 percent, the air density at sea level is 1.17447 kg/m^3
At a relative humidity of 30 percent, the air density at sea level is 1.17293 kg/m^3
At a relative humidity of 40 percent, the air density at sea level is 1.1714 kg/m^3
At a relative humidity of 50 percent, the air density at sea level is 1.16986 kg/m^3
At a relative humidity of 60 percent, the air density at sea level is 1.16832 kg/m^3
At a relative humidity of 70 percent, the air density at sea level is 1.16678 kg/m^3
At a relative humidity of 80 percent, the air density at sea level is 1.16524 kg/m^3
At a relative humidity of 90 percent, the air density at sea level is 1.16371 kg/m^3
At a relative humidity of 100 percent, the air density at sea level is 1.16217 kg/m^3

Temperature for this humidity data is 85 degrees f.

At a relative humidity of 0 percent, the air density at sea level is 1.16674 kg/m^3
At a relative humidity of 10 percent, the air density at sea level is 1.16495 kg/m^3
At a relative humidity of 20 percent, the air density at sea level is 1.16317 kg/m^3
At a relative humidity of 30 percent, the air density at sea level is 1.16138 kg/m^3
At a relative humidity of 40 percent, the air density at sea level is 1.1596 kg/m^3
At a relative humidity of 50 percent, the air density at sea level is 1.15781 kg/m^3
At a relative humidity of 60 percent, the air density at sea level is 1.15603 kg/m^3
At a relative humidity of 70 percent, the air density at sea level is 1.15424 kg/m^3
At a relative humidity of 80 percent, the air density at sea level is 1.15246 kg/m^3
At a relative humidity of 90 percent, the air density at sea level is 1.15067 kg/m^3
At a relative humidity of 100 percent, the air density at sea level is 1.14889 kg/m^3

Temperature for this humidity data is 90 degrees f.

At a relative humidity of 0 percent, the air density at sea level is 1.15613 kg/m^3
At a relative humidity of 10 percent, the air density at sea level is 1.15405 kg/m^3
At a relative humidity of 20 percent, the air density at sea level is 1.15198 kg/m^3
At a relative humidity of 30 percent, the air density at sea level is 1.1499 kg/m^3
At a relative humidity of 40 percent, the air density at sea level is 1.14783 kg/m^3
At a relative humidity of 50 percent, the air density at sea level is 1.14575 kg/m^3
At a relative humidity of 60 percent, the air density at sea level is 1.14367 kg/m^3
At a relative humidity of 70 percent, the air density at sea level is 1.1416 kg/m^3

TABLE 1-continued

Atmospheric pressure data (at sea level) based on temperature and humidity Data is based on published values of $H_2O$ saturation vapor pressure Calculations are based on the law of partial pressures and the ideal gas law At a relative humidity of 80 percent, the air density at sea level is 1.13952 kg/m^3
At a relative humidity of 90 percent, the air density at sea level is 1.13745 kg/m^3
At a relative humidity of 100 percent, the air density at sea level is 1.13537 kg/m^3
Temperature for this humidity data is 95 degrees f.

At a relative humidity of 0 percent, the air density at sea level is 1.1457 kg/m^3
At a relative humidity of 10 percent, the air density at sea level is 1.1433 kg/m^3
At a relative humidity of 20 percent, the air density at sea level is 1.1409 kg/m^3
At a relative humidity of 30 percent, the air density at sea level is 1.1385 kg/m^3
At a relative humidity of 40 percent, the air density at sea level is 1.13609 kg/m^3
At a relative humidity of 50 percent, the air density at sea level is 1.13369 kg/m^3
At a relative humidity of 60 percent, the air density at sea level is 1.13129 kg/m^3
At a relative humidity of 70 percent, the air density at sea level is 1.12888 kg/m^3
At a relative humidity of 80 percent, the air density at sea level is 1.12648 kg/m^3
At a relative humidity of 90 percent, the air density at sea level is 1.12408 kg/m^3
At a relative humidity of 100 percent, the air density at sea level is 1.12168 kg/m^3
Temperature for this humidity data is 100 degrees f.

At a relative humidity of 0 percent, the air density at sea level is 1.13547 kg/m^3
At a relative humidity of 10 percent, the air density at sea level is 1.13269 kg/m^3
At a relative humidity of 20 percent, the air density at sea level is 1.12991 kg/m^3
At a relative humidity of 30 percent, the air density at sea level is 1.12713 kg/m^3
At a relative humidity of 40 percent, the air density at sea level is 1.12435 kg/m^3
At a relative humidity of 50 percent, the air density at sea level is 1.12157 kg/m^3
At a relative humidity of 60 percent, the air density at sea level is 1.11879 kg/m^3
At a relative humidity of 70 percent, the air density at sea level is 1.11601 kg/m^3
At a relative humidity of 80 percent, the air density at sea level is 1.11323 kg/m^3
At a relative humidity of 90 percent, the air density at sea level is 1.11045 kg/m^3
At a relative humidity of 100 percent, the air density at sea level is 1.10767 kg/m^3
Temperature for this humidity data is 105 degrees f.

At a relative humidity of 0 percent, the air density at sea level is 1.12541 kg/m^3
At a relative humidity of 10 percent, the air density at sea level is 1.12221 kg/m^3
At a relative humidity of 20 percent, the air density at sea level is 1.11901 kg/m^3
At a relative humidity of 30 percent, the air density at sea level is 1.11581 kg/m^3
At a relative humidity of 40 percent, the air density at sea level is 1.11261 kg/m^3
At a relative humidity of 50 percent, the air density at sea level is 1.10941 kg/m^3
At a relative humidity of 60 percent, the air density at sea level is 1.10621 kg/m^3
At a relative humidity of 70 percent, the air density at sea level is 1.10301 kg/m^3
At a relative humidity of 80 percent, the air density at sea level is 1.09981 kg/m^3
At a relative humidity of 90 percent, the air density at sea level is 1.09661 kg/m^3
At a relative humidity of 100 percent, the air density at sea level is 1.09341 kg/m^3
Temperature for this humidity data is 110 degrees f.

At a relative humidity of 0 percent, the air density at sea level is 1.11554 kg/m^3
At a relative humidity of 10 percent, the air density at sea level is 1.11188 kg/m^3
At a relative humidity of 20 percent, the air density at sea level is 1.10823 kg/m^3
At a relative humidity of 30 percent, the air density at sea level is 1.10457 kg/m^3
At a relative humidity of 40 percent, the air density at sea level is 1.10092 kg/m^3
At a relative humidity of 50 percent, the air density at sea level is 1.09726 kg/m^3
At a relative humidity of 60 percent, the air density at sea level is 1.09361 kg/m^3
At a relative humidity of 70 percent, the air density at sea level is 1.08995 kg/m^3
At a relative humidity of 80 percent, the air density at sea level is 1.0863 kg/m^3
At a relative humidity of 90 percent, the air density at sea level is 1.08264 kg/m^3
At a relative humidity of 100 percent, the air density at sea level is 1.07899 kg/m^3
Temperature for this humidity data is 115 degrees f.

At a relative humidity of 0 percent, the air density at sea level is 1.10583 kg/m^3
At a relative humidity of 10 percent, the air density at sea level is 1.10165 kg/m^3
At a relative humidity of 20 percent, the air density at sea level is 1.09746 kg/m^3
At a relative humidity of 30 percent, the air density at sea level is 1.09328 kg/m^3
At a relative humidity of 40 percent, the air density at sea level is 1.08909 kg/m^3
At a relative humidity of 50 percent, the air density at sea level is 1.08491 kg/m^3
At a relative humidity of 60 percent, the air density at sea level is 1.08072 kg/m^3
At a relative humidity of 70 percent, the air density at sea level is 1.07654 kg/m^3
At a relative humidity of 80 percent, the air density at sea level is 1.07236 kg/m^3
At a relative humidity of 90 percent, the air density at sea level is 1.06817 kg/m^3
At a relative humidity of 100 percent, the air density at sea level is 1.06399 kg/m^3
Temperature for this humidity data is 120 degrees f.

At a relative humidity of 0 percent, the air density at sea level is 1.09629 kg/m^3
At a relative humidity of 10 percent, the air density at sea level is 1.09151 kg/m^3
At a relative humidity of 20 percent, the air density at sea level is 1.08674 kg/m^3
At a relative humidity of 30 percent, the air density at sea level is 1.08196 kg/m^3
At a relative humidity of 40 percent, the air density at sea level is 1.07718 kg/m^3

TABLE 1-continued

Atmospheric pressure data (at sea level) based on temperature and humidity Data is based on published values of $H_2O$ saturation vapor pressure Calculations are based on the law of partial pressures and the ideal gas law At a relative humidity of 50 percent, the air density at sea level is 1.0724 kg/m^3
At a relative humidity of 60 percent, the air density at sea level is 1.06762 kg/m^3
At a relative humidity of 70 percent, the air density at sea level is 1.06284 kg/m^3
At a relative humidity of 80 percent, the air density at sea level is 1.05807 kg/m^3
At a relative humidity of 90 percent, the air density at sea level is 1.05329 kg/m^3
At a relative humidity of 100 percent, the air density at sea level is 1.04851 kg/m^3
Temperature for this humidity data is 125 degrees f.

At a relative humidity of 0 percent, the air density at sea level is 1.08692 kg/m^3
At a relative humidity of 10 percent, the air density at sea level is 1.08147 kg/m^3
At a relative humidity of 20 percent, the air density at sea level is 1.07603 kg/m^3
At a relative humidity of 30 percent, the air density at sea level is 1.07059 kg/m^3
At a relative humidity of 40 percent, the air density at sea level is 1.06514 kg/m^3
At a relative humidity of 50 percent, the air density at sea level is 1.0597 kg/m^3
At a relative humidity of 60 percent, the air density at sea level is 1.05426 kg/m^3
At a relative humidity of 70 percent, the air density at sea level is 1.04881 kg/m^3
At a relative humidity of 80 percent, the air density at sea level is 1.04337 kg/m^3
At a relative humidity of 90 percent, the air density at sea level is 1.03793 kg/m^3
At a relative humidity of 100 percent, the air density at sea level is 1.03248 kg/m^3

Figure 6:
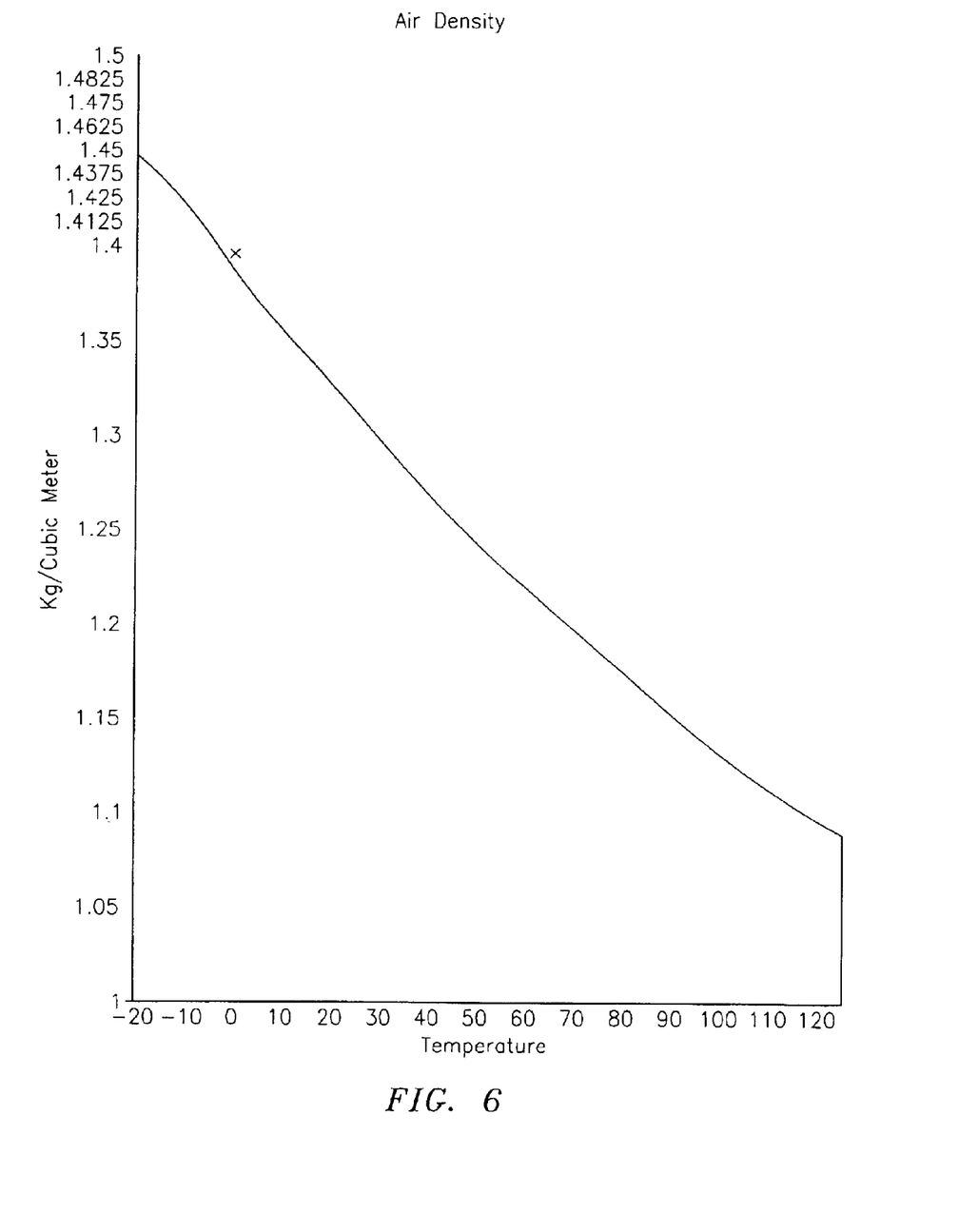
FIG. 6 is a graph illustrating plotted air density data output from an air density model.
Figure 7:
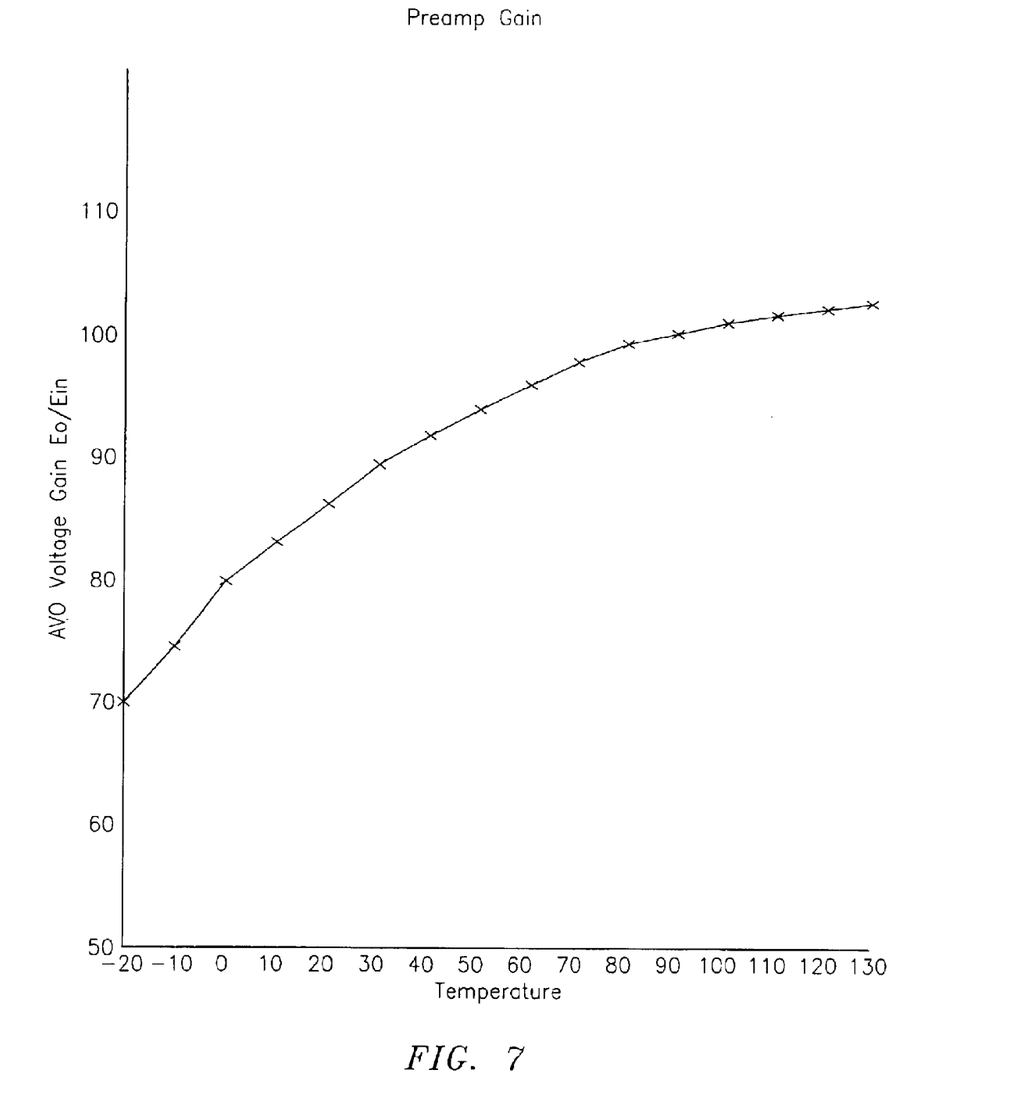
FIG. 7 is a graph illustrating plotted gain data output from a gain model.
Figure 8:
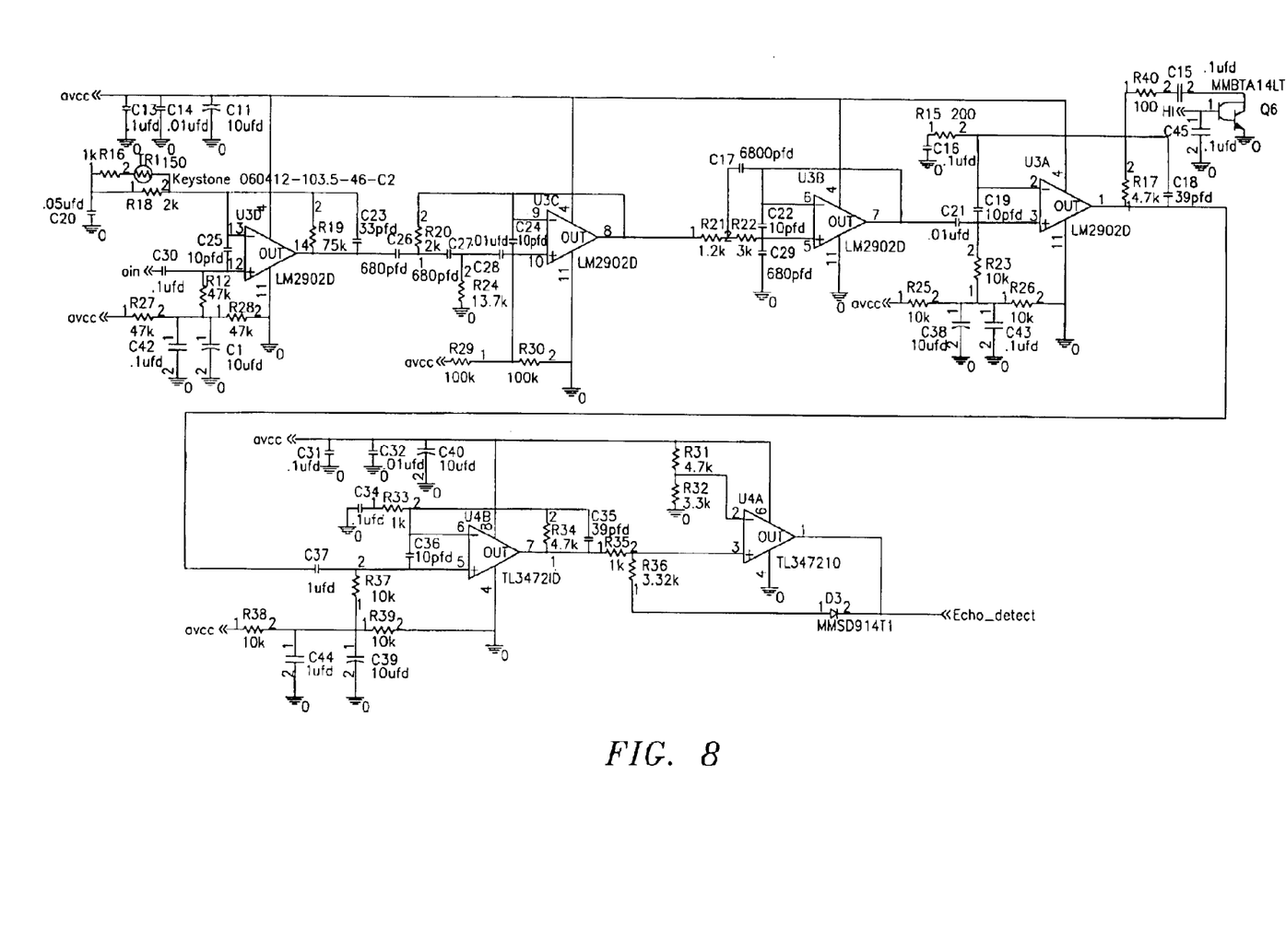
FIG. 8 is a schematic circuit diagram illustrating an intelligent sensor in one embodiment.

From a plot of this data, slope of the curve at any point may be calculated and a matching preamp gain curve generated. In this case, the standard gain formula of the ideal non-inverting op-amp, E(o)/E(in)=R(in)+R(f)R(in), is used. R(in) in this equation has the temperature compensation network substituted for it. Referring to the sensor schematic of FIG. 8, E(o)/E(in) is calculated according to the following equation:

$$E(o)/E(in)=(((R16+TR1)*(R16+TR1))/((R16+TR1)+(R16+TR1)))+(R18)/(((R16+TR1)*(R16+TR1))/((R16+TR1)+(R16+TR1)))$$

Where TR1 changes with temperature. When calculated over temperature the values in Table 2 result. FIG. 6 represents the plotted data of Table 1, and FIG. 7 represents the plotted data of Table 2.

TABLE 2

At −40 deg. c. with trim = 1000 thrm = 1752 fb1 = 2000 fb2 = 33000 gain = 28.54018
At −35 deg. c. with trim = 1000 thrm = 1392 fb1 = 2000 fb2 = 33000 gain = 30.22285
At −30 deg. c. with trim = 1000 thrm = 1115 fb1 = 2000 fb2 = 33000 gain = 31.90042
At −25 deg. c. with trim = 1000 thrm = 900 fb1 = 2000 fb2 = 33000 gain = 33.53286
At −20 deg. c. with trim = 1000 thrm = 732 fb1 = 2000 fb2 = 33000 gain = 35.08427
At −15 deg. c. with trim = 1000 thrm = 599 fb1 = 2000 fb2 = 33000 gain = 36.53813
At −10 deg. c. with trim = 1000 thrm = 494 fb1 = 2000 fb2 = 33000 gain = 37.86408
At −5 deg. c. with trim = 1000 thrm = 409 fb1 = 2000 fb2 = 33000 gain = 39.0783
At 0 deg. c. with trim = 1000 thrm = 341 fb1 = 2000 fb2 = 33000 gain = 40.15735
At 5 deg. c. with trim = 1000 thrm = 286 fb1 = 2000 fb2 = 33000 gain = 41.11112
At 10 deg. c. with trim = 1000 thrm = 241 fb1 = 2000 fb2 = 33000 gain = 41.95243
At 15 deg. c. with trim = 1000 thrm = 205 fb1 = 2000 fb2 = 33000 gain = 42.66929
At 20 deg. c. with trim = 1000 thrm = 175 fb1 = 2000 fb2 = 33000 gain = 43.29915
At 25 deg. c. with trim = 1000 thrm = 150 fb1 = 2000 fb2 = 33000 gain = 43.84831
At 30 deg. c. with trim = 1000 thrm = 129 fb1 = 2000 fb2 = 33000 gain = 44.32777
At 35 deg. c. with trim = 1000 thrm = 112 fb1 = 2000 fb2 = 33000 gain = 44.72871
At 40 deg. c. with trim = 1000 thrm = 97 fb1 = 2000 fb2 = 33000 gain = 45.09245
At 45 deg. c. with trim = 1000 thrm = 85 fb1 = 2000 fb2 = 33000 gain = 45.39042
At 50 deg. c. with trim = 1000 thrm = 75 fb1 = 2000 fb2 = 33000 gain = 45.64364
At 55 deg. c. with trim = 1000 thrm = 66 fb1 = 2000 fb2 = 33000 gain = 45.87546
At 60 deg. c. with trim = 1000 thrm = 58 fb1 = 2000 fb2 = 33000 gain = 46.08471
At 65 deg. c. with trim = 1000 thrm = 52 fb1 = 2000 fb2 = 33000 gain = 46.24365
At 70 deg. c. with trim = 1000 thrm = 46 fb1 = 2000 fb2 = 33000 gain = 46.40436
At 75 deg. c. with trim = 1000 thrm = 41 fb1 = 2000 fb2 = 33000 gain = 46.53966
At 80 deg. c. with trim = 1000 thrm = 37 fb1 = 2000 fb2 = 33000 gain = 46.64879
At 85 deg. c. with trim = 1000 thrm = 33 fb1 = 2000 fb2 = 33000 gain = 46.75873

The uncompensated gain is 17.17647 at trim=1000, fb1=2000, and fb2=33000. The air density and gain models compensate for changes in temperature by first modeling air density as a function of temperature. Sound travels better when air density is high, that is, air molecules are closer together allowing for better medium for sound to travel. Accordingly, as air density goes up, gain is adjusted to be decreased.

Figure 3:
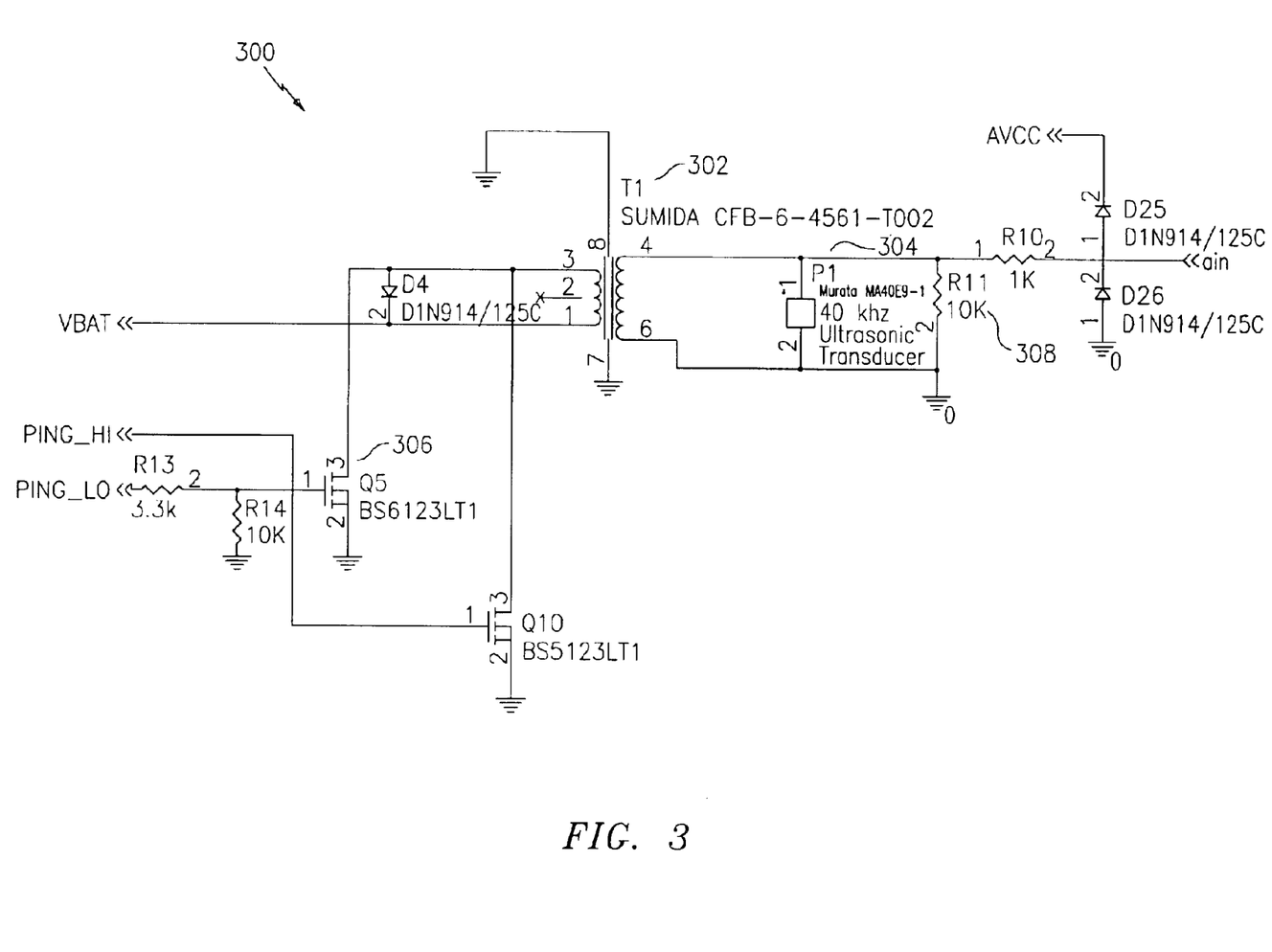
FIG. 3 is an electrical schematic circuit diagram of a drive circuit in one embodiment of the present invention for controlling output sound pressure level in an ultrasonic transducer.

FIG. 3 is an electrical schematic circuit diagram of a drive circuit in one embodiment of the present invention. The drive circuit 108 shown in FIG. 1, for example, may be implemented according to this circuit diagram. This drive circuit controls output sound pressure level ("SPL") in an ultrasonic transducer such that the sound pressure levels may be reduced at extremely low temperatures where sound travels best. That is, when the temperature is lower, air density is high, and since sound travels better in the denser air, lower SPL may be needed.

The ultrasonic transducer is an electromechanical device. When a voltage is applied, a ceramic element is displaced to move air. The shape, mass, and applied voltage determine the displacement. Thus, sound is generated by flexing a piezo electric element. The more voltage applied the more the element is flexed. The more it is flexed the higher the output sound pressure level. Maximum applied voltage is 140 VPP at 40 kHz. This voltage level generates a minimum 108 db SPL. Any voltage less than 140 VPP generates less output.

The drive circuit 300 in one aspect includes a logic level field effect transistor (FET) 306 to pulse a primary of a step up transformer. Transformer T1 302 is a step-up transformer that steps 8.75 V up to 140 V. When Q5 has 5V applied to the gate of the transistor 306, PING_HI 140 V is applied to the transducer element 304. When Q5 has 3V applied to the gate of the transistor 306, PING_LO 80V is applied to the transducer element 304. This provides two different maximum drive levels.

The secondary of T1 302 and the inherent capacitance of the transducer 304 form a tank circuit with a Q>50 without R11 308 in place. The Q of the tank circuit determines how fast the transducer ramps up to full sound pressure level. R11 308 programs the final Q of the circuit. In general, R11 308 determines how much energy is lost between excitation pulses and programs the transducer ramp.

Before the first excitation pulse, the transducer element 304 is a mass at rest. A mass at rest tends to remain at rest. As such, the first excitation pulse does not yield maximum deflection of the transducer element. Depending on how much energy R11 308 is lost between pulses, and the mass of the element, maximum deflection/voltage may never be reached or it may be reached from 2 to 8 pulses. Using two different maximum voltages with a known ramp up allows for the generation of any output SPL up to the maximum. The FET 306 may be controlled by a micro-controller, which includes software that controls the pulsing of the transducer, thus controls output sound pressure levels with software.

Figure 4:
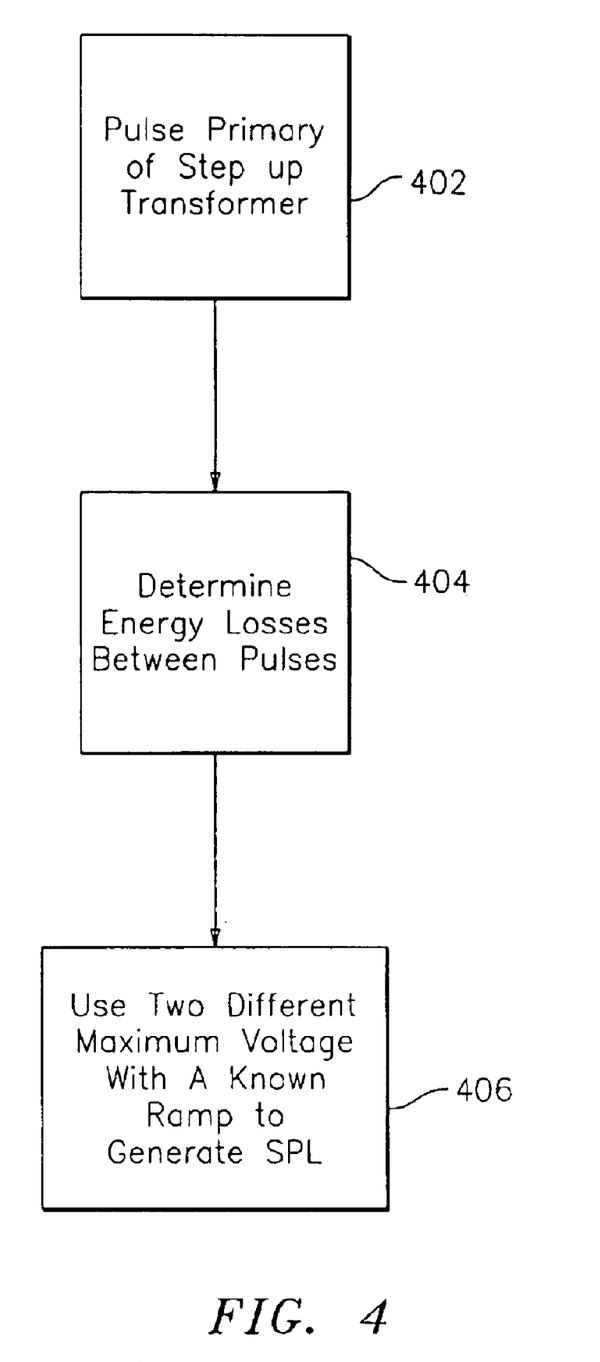
FIG. 4 is a flow diagram illustrating the method of controlling output sound pressure level in an ultrasonic transducer in one embodiment of the present invention.

FIG. 4 is a flow diagram illustrating the method of controlling output sound pressure level in an ultrasonic transducer in one embodiment of the present invention. At 402, micro-controller controlled FET is used to pulse a primary step up transformer. For example, a step-up transformer steps 8.75 volts up to 140 volts. Depending on the voltage applied to the FET, up to 140 volts may be applied to the transducer. Thus, for example, having 3 volts applied at the gate of the FET will apply 140 volts to the transducer; having 5 volts applied at the gate of the FET will apply 80 volts to the transducer, providing two different maximum drive levels. At 404, a resistor determines how much energy is lost between excitation pulses to determine the number of pulses needed for the transducer to reach maximum voltage, and ultimately deflection. Accordingly, at 406, using two different maximum voltages with a known ramp up, a desired output sound pressure level up to the maximum is generated.

Figure 5:
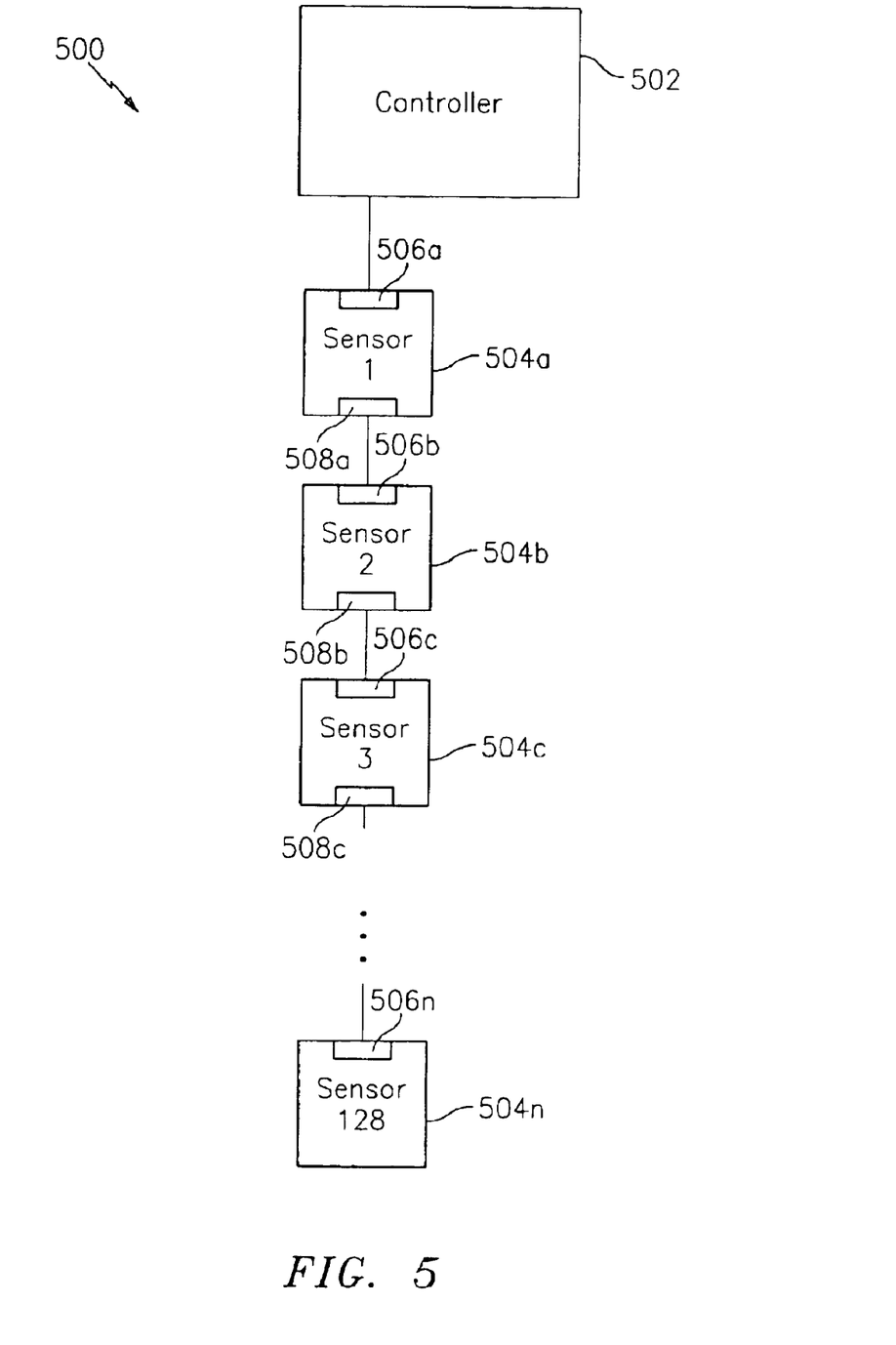
FIG. 5 is a communications network diagram illustrating the sensor network in one embodiment of the present invention.
Figure 9:
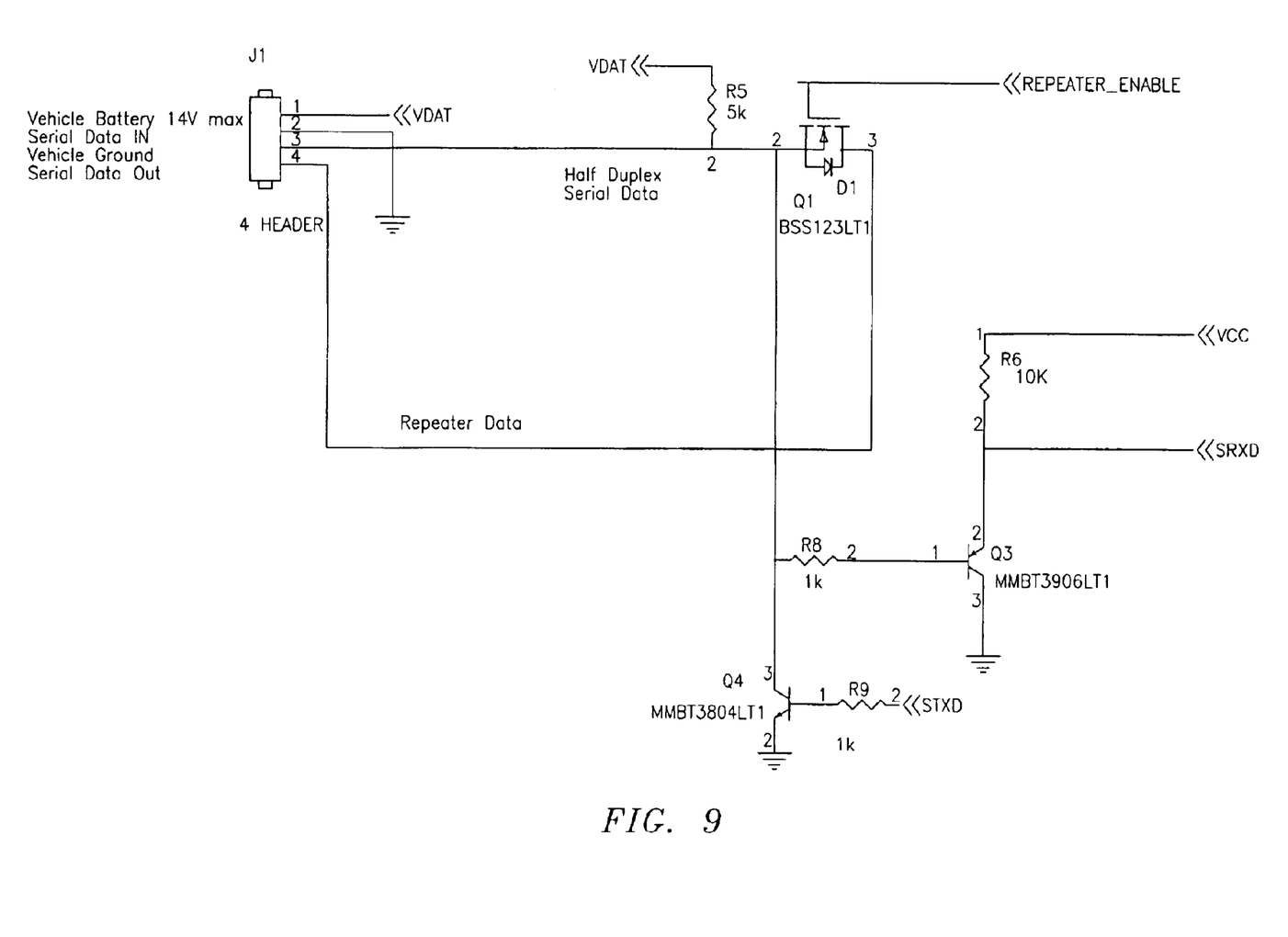
FIG. 9 is a schematic diagram illustrating an individual sensor shown in FIG. 5.

FIG. 5 is a communications system network diagram illustrating the sensor network in one embodiment of the present invention. The communications system allows the sensors 504*a* to 504*n* in the network 500 to be programmed at run time. FIG. 9 is a schematic diagram illustrating an individual sensor shown in FIG. 5. Referring to FIGS. 5 and 9, a first sensor 504*a* in the network has its data input 506*a* tied, or electrically connected, to a controller 502. The first sensor's data output 508*a*, the drain of MOSFET Q1, is tied to the second sensor's data input 506*b*. The second sensor's data output 508*b* is tied to the third sensor's data input 506*c*. All sensors 504*a* to 504*n* in the network 500 are tied this way up to for example, 128 sensors in a daisy chain fashion.

Since diode D1 of Q1 is reversed biased, Q1 can operate as a high power analog switch. This switch can provide the serially connected sensors to operate serially without complex readdressing wiring or algorithms if the sensors are relocated.

Initially, all sensors 504*a* to 504*n* in the network are turned off and their addresses are set to "$ff." At power-up, only sensor 1 504*a*, for example, is electrically connected to the controller 502. All subsequent sensors 504*b* ... 504*n* are isolated from the controller 502 and still turned off. The connection with the controller 502 from these sensors 504*b* ... 504*n* are through the previous sensors. At power-up, the controller 502 directs the first sensor 504*a* to turn itself on and assigns the first sensor 504*a* an address. Using the address, the controller 502 then directs the first sensor 504*a* to direct the second sensor 502*b* to turn itself on and assigns the second sensor 502*b* its address. In this daisy chain fashion, the controller 502 turns on all the sensors and assigns them addresses.

After power-up, the controller 502 polls the sensors 504*a* ... 504*n* for their addresses. If an address of $ff is returned to the controller 502 from any one of the sensors 504*a* ... 504*n*, the controller 502 assigns a valid address. The controller 502 then turns on Q1 for the addressed sensors.

In one aspect, the returned addresses from the sensors when polled by the controller 502 may be accumulated in a sensor array. The controller 502 then addresses each element in the sensor array, and for each $ff address encountered in the sensor array, the controller assigns a valid address to the sensor and turns on Q1 for the addressed sensor. This unique scheme of assigning addresses at runtime allows all sensors to be interchangeable with one another. This is advantageous, for example, when a sensor installed in front of a vehicle needs to be moved to the back. The sensor being moved need not be individually reprogrammed before being installed at its new location.

In one aspect, each sensor's dimension is typically less than or equal to 55 mm (L)×25 mm (W)×20 mm (H). Active board area is about 9. square centimeters. These dimensions, however, may be altered. Sensors are typically mounted about 30 inches above the ground, with appropriate spacing to cover the width of the surface. A single sensor may cover an area of 1.5 meters by 3 meters.

Sensor response is unsolicited. Sensors respond to the host if a sensor error occurred as a result of the last command or if a target was detected. If a sensor times out without finding a valid target it does not report so as not to burden the communications channel. Responses are sent to the controller in a form of designated bit patterns. Examples of responses from the sensors include:

$4c8014e0 Address zone 1 unit 4 found a target at 11 ft. 6 in., checksum is $e0.

$00016364 Address zone 6 unit 3 suffered a transducer error, checksum is $64.

The above described invention can compensate for the attenuation changes by adjusting for changes in air temperature and changes in air density. Then the microcontroller can adjust for the speed of sound to calculate the distance to an object.

While the invention has been described with reference to several embodiments, it will be understood by those skilled in the art that the invention is not limited to the specific forms shown and described. Thus, various changes in form and details may be made therein without departing from the spirit and scope of the invention as defined by the appended claims.

What is claimed is:

1. An ultrasonic sensor, comprising:
   a transducer for transmitting and receiving sound waves;
   a drive circuit connected to the transducer for driving the transducer to produce sound waves according to predetermined sound pressure level;
   a microcontroller connected to the drive circuit for directing the drive circuit to produce a predetermined amount of voltage, the amount of voltage determined as a function of environment temperature and the predetermined amount of voltage directly related to the predetermined sound pressure level; and
   a dynamic temperature model that allows gain on the received sound waves to be adjusted, the gain being adjusted as a function of temperature,
   wherein the dynamic temperature model includes an air density model and a gain model, and the gain increases as air density decreases.

2. The ultrasonic sensor of claim 1, wherein the amount of voltage increases as the environment temperature increases.

3. The ultrasonic sensor of claim 1, wherein the gain increases as the temperature increases.

4. The ultrasonic sensor of claim 1, further comprising:
   an amplifier for adjusting the gain according to the dynamic temperature model.

5. The ultrasonic sensor of claim 1, wherein the drive circuit comprises:
   a logic level field effect transistor; and
   a step up transformer connected to the logic level field effect transistor that steps up voltage applied to the logic level field effect transistor and applies the voltage to the transducer.

6. The ultrasonic sensor of claim 1, further comprising:
   a controller, connected to the microcontroller, for receiving information from the microcontroller about detected objects and alerting a user.

7. An ultrasonic detection system, comprising:
   a controller; and
   a plurality of sensors, each of the plurality of sensors having at least a data input and data output,
   wherein the plurality of sensors are serially connected and the controller polls and configures an address for each of the plurality of sensors in real time through a chain in the plurality of sensors.

8. The ultrasonic detection system of claim 7, wherein the controller directs a first one of the plurality of sensors to switch itself on and configures an address for the first one of the plurality of sensors.

9. The ultrasonic detection system of claim 8, wherein the controller directs the first one of the plurality of sensors to direct a second one of the plurality of sensors to switch itself on and passes a configured address for the second one of the plurality of sensors via the first one of the plurality of sensors.

10. The ultrasonic detection system of claim 7, wherein each of the plurality of sensors include:
    a transducer for transmitting and receiving sound waves;
    a drive circuit connected to the transducer for driving the transducer to produce sound waves according to predetermined sound pressure level; and
    a microcontroller connected to the drive circuit for directing the drive circuit to produce a predetermined amount of voltage, the amount of voltage determined as a function of environment temperature and the predetermined amount of voltage directly related to the predetermined sound pressure level.

11. An ultrasonic sensor, comprising:
    a transducer for transmitting and receiving sound waves;
    a drive circuit connected to the transducer for driving the transducer to produce sound waves according to predetermined sound pressure level, the drive circuit comprising:
      a logic level field effect transistor; and
      a step up transformer connected to the logic level field effect transistor that steps up voltage applied to the logic level field effect transistor and applies the voltage to the transducer; and
    a microcontroller connected to the drive circuit for directing the drive circuit to produce a predetermined amount of voltage, the amount of voltage determined as a function of environment temperature and the predetermined amount of voltage directly related to the predetermined sound pressure level.

* * * * *